Nov. 5, 1935.　　　A. G. OGDEN　　　2,019,764
PHOTOGRAPHIC APPARATUS
Original Filed Jan. 10, 1930　　6 Sheets-Sheet 2

INVENTOR-
*Ashley G. Ogden*
BY
*Ward, Crosby & Neal*
ATTORNEYS

Nov. 5, 1935.  A. G. OGDEN  2,019,764

PHOTOGRAPHIC APPARATUS

Original Filed Jan. 10, 1930  6 Sheets-Sheet 3

INVENTOR-
Ashley G. Ogden
BY Ward, Crosby & Neal
ATTORNEYS

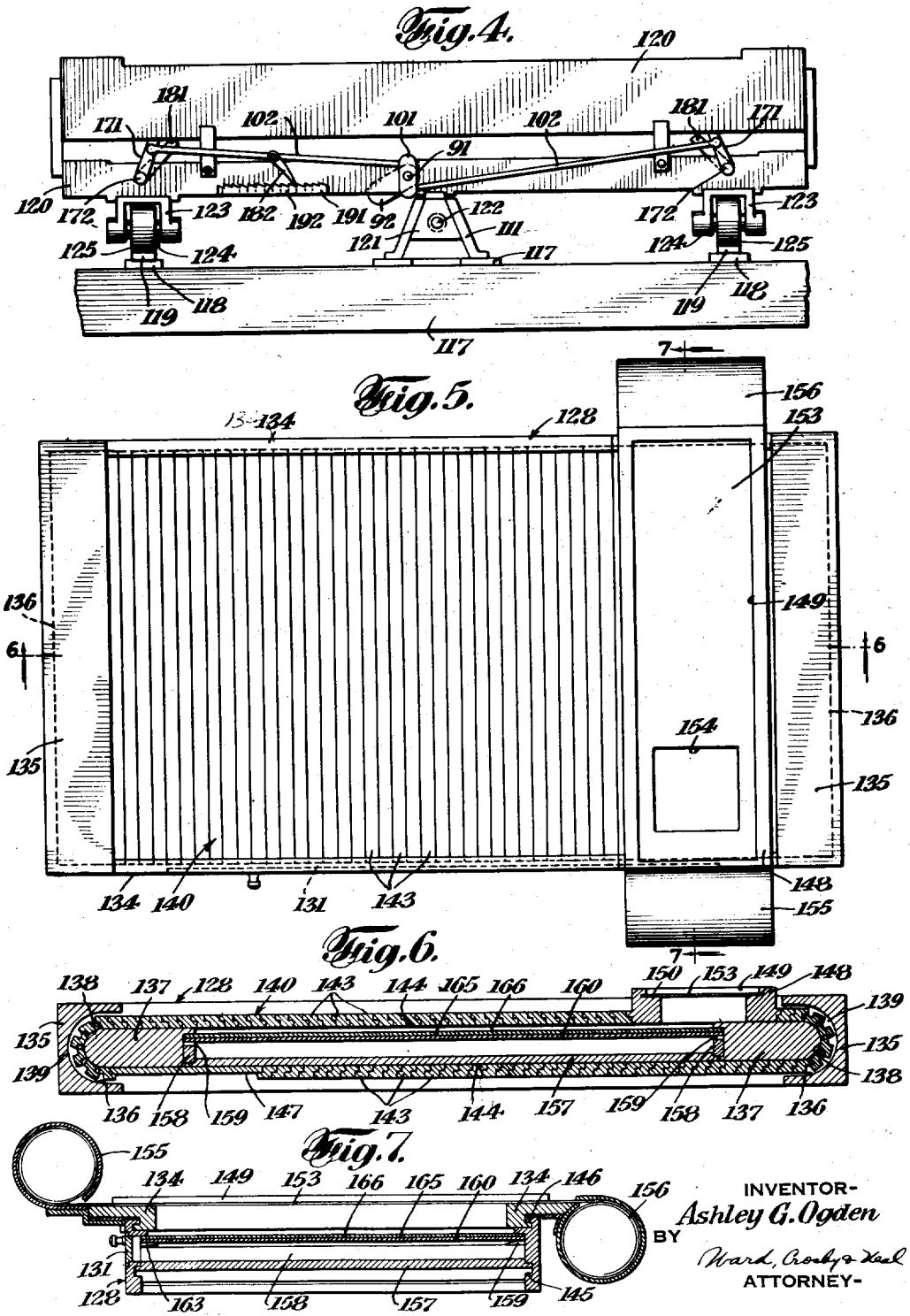

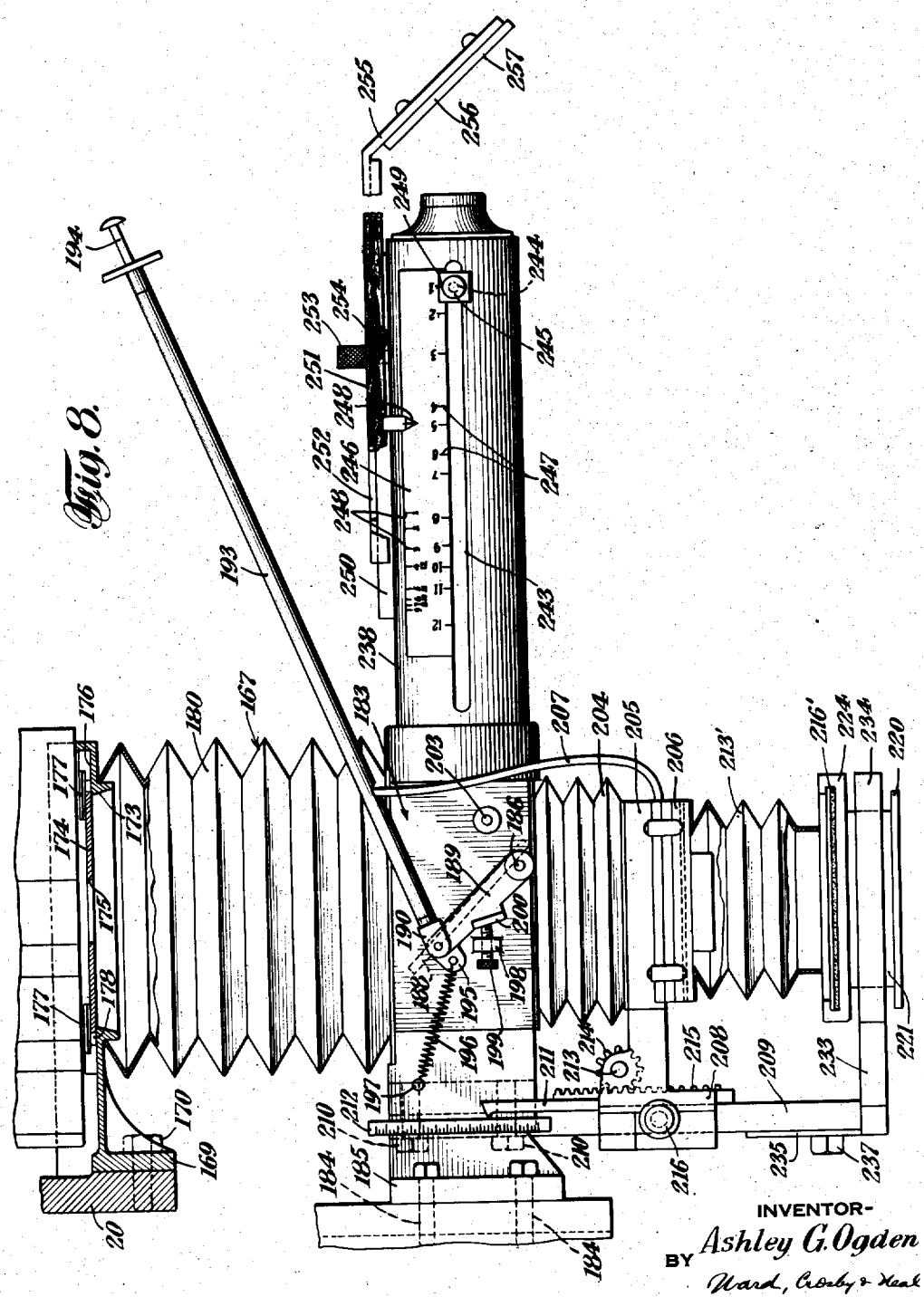

Nov. 5, 1935.  A. G. OGDEN  2,019,764

PHOTOGRAPHIC APPARATUS

Original Filed Jan. 10, 1930   6 Sheets-Sheet 6

INVENTOR-
Ashley G. Ogden
BY
Ward, Crosby & Neal
ATTORNEYS

Patented Nov. 5, 1935

2,019,764

UNITED STATES PATENT OFFICE 2,019,764

PHOTOGRAPHIC APPARATUS

Ashley G. Ogden, Miami, Fla., assignor to General Printing Ink Corporation, New York, N. Y., a corporation of Delaware Original application January 10, 1930, Serial No. 419,775. Divided and this application January 3, 1933, Serial No. 649,982

2 Claims. (Cl. 88—24)

My invention relates to the photo-composing art and has particular reference to a machine adapted for the rapid and efficient preparation of photographic compositions.

The invention provides a simple and practical machine adapted for the production of a variety of fanciful and selective compositions.

Various other advantages, characteristics and features of the invention will become apparent from the following description taken in connection with the accompanying drawings.

My invention resides in the photo-composing machine, features, combinations and arrangements of the character hereinafter described and claimed.

This application is a division of my application Serial No. 419,775, filed January 10, 1930, which has become U. S. Letters Patent-No. 1,893,439, January 3, 1933.

For an understanding of my invention and for an illustration of one of the various forms thereof, reference is to be had to the accompanying drawings, in which:

Fig. 4 is an elevational view of the sensitized film carriage and the light-proof casing;

Fig. 5 is a plan view of the light-proof casing;

Fig. 6 is a vertical sectional view, taken substantially on the line 6—6 of Fig. 5 looking in the direction of the arrows;

Fig. 7 is a vertical sectional view, taken substantially on the line 7—7 of Fig. 5 looking in the direction of the arrows;

Fig. 8 is an enlarged elevational view, partly in section, of a part of the machine shown in Figs. 1, 2 and 3;

Figure 1:
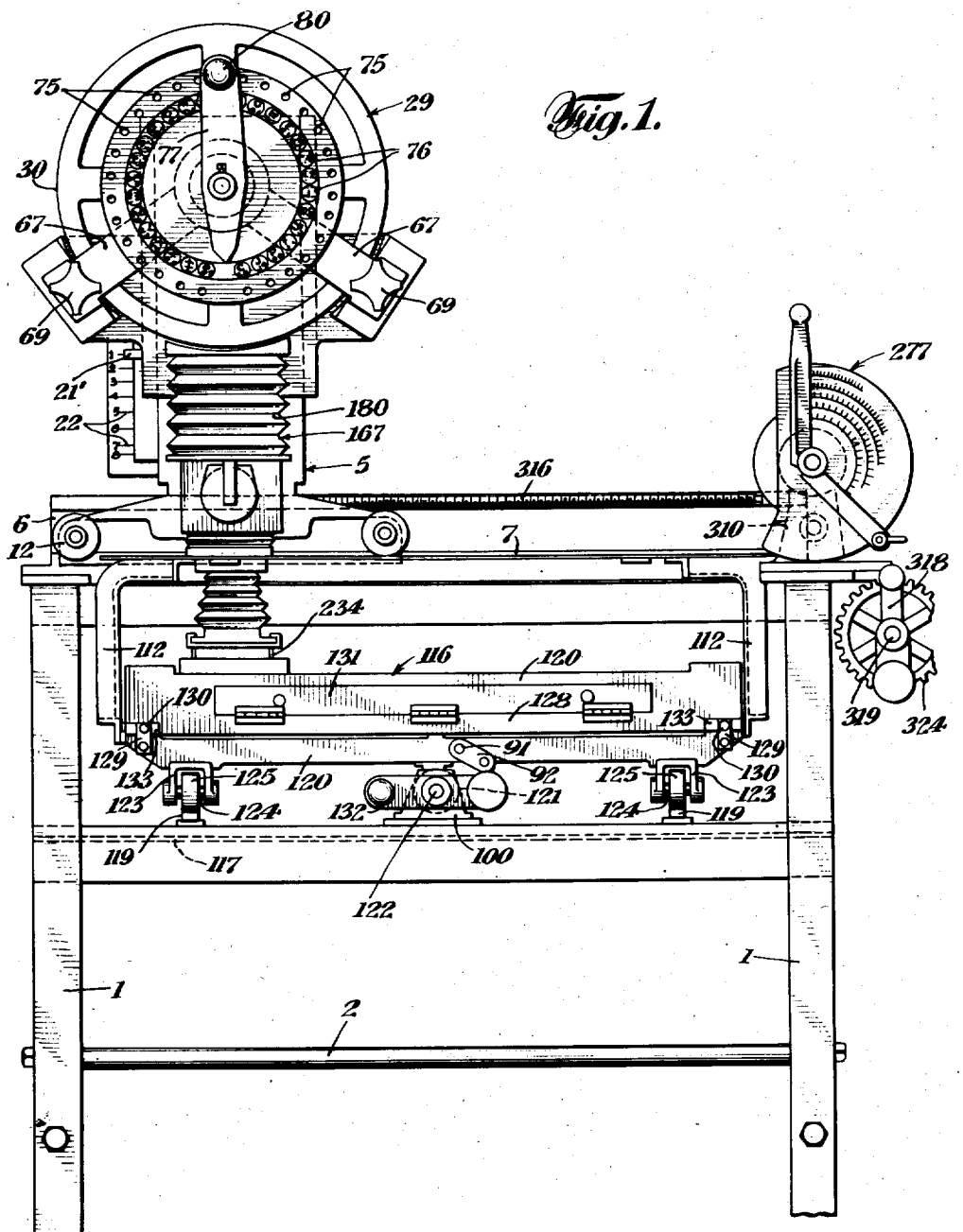
Figure 1 is a front elevational view of a machine as constructed in accordance with my invention.
Figure 2:
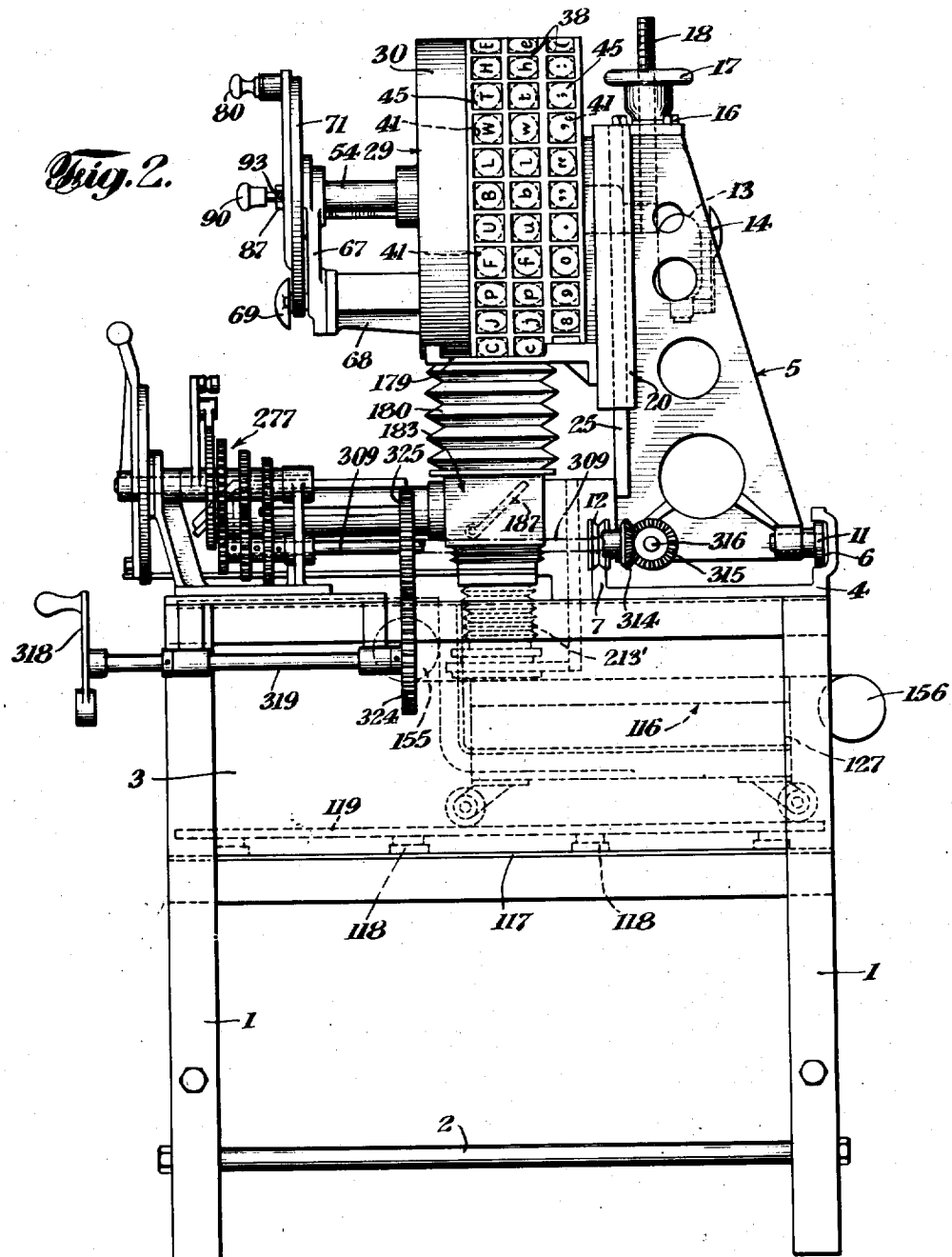
Fig. 2 is a side elevational view of the machine shown in Fig. 1.
Figure 3:
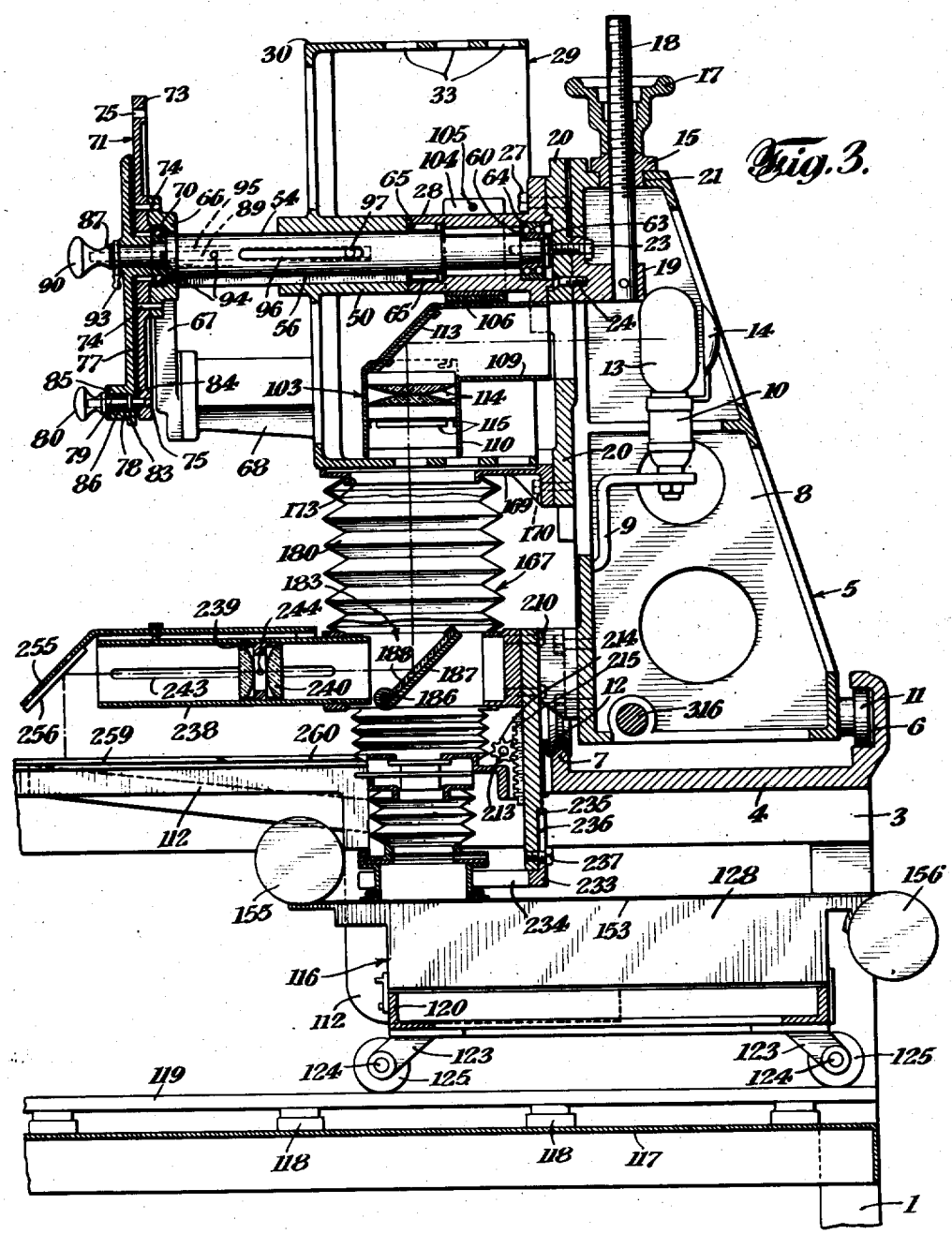
Fig. 3 is a vertical sectional view, partly in elevation, of the machine shown in Figs. 1 and 2.

Referring to the drawings, the invention is shown as constituted by an organization which is mounted on a frame structure comprising legs 1, tie rods 2 and panels 3, Figs. 1, 2 and 3. This frame structure is surmounted by a bed plate 4 which is constructed to permit the travel of a carriage unit 5 therealong. For this purpose the bed plate 4 is provided with a pair of tracks constituted by a channel 6 and a rail flange 7 having a longitudinal triangular edge.

The carriage unit 5, Fig. 3, comprises a frame structure 8 having secured thereto a bracket 9 upon which is mounted a socket 10. This socket 10 receives a lamp 13 and has also secured thereto a reflector 14.

Rotatably mounted with respect to the carriage unit 5 on suitable axles are rollers 11 and 12. The rollers 11 ride along the channel 6 and the rollers 12 have V-grooved peripheries which correspond to the triangular edge of the rail flange 7, so as to permit riding engagement therewith.

Extending through the top of the frame structure 8 is a bore 21 having mounted therein a flanged bushing 15 which is secured to the frame structure 8 by means of lag bolts 16, Fig. 2. A hand wheel 17, Fig. 3, is mounted in said bushing 15 and has passing therethrough a threaded spindle 18. Secured to one end of said spindle 18 is a member 19 which is affixed to a channel plate 20 by means of bolts 23 and screws 24. The frame structure 8, Fig. 2, has integral therewith flanges 25 which are embraced by the channel plate 20, so that said plate is guided vertically therealong in response to the actuation of the hand wheel 17. This channel plate 20 has also secured thereto a pointer 21' which cooperates with a scale 22 mounted on the side of the frame structure 8, Fig. 1. The significance of this scale will be hereinafter discussed.

Secured to the channel plate 20, Fig. 3, by means of bolts 27 is a flanged sleeve 28 upon which is mounted the character-bearing unit 29. This unit 29 comprises a drum 30 having upon its periphery three rows of equally spaced perforations 33. As more fully described in my aforesaid pending application, a pair of flexible character-bearing bands 38 are suitably supported on the periphery of the drum 30, each of these bands being provided with three rows of apertures 41 which register, respectively, with the apertures 33 on the drum. Plates 45 are secured to the bands 38 over each of the respective apertures 41, these plates 45, except those portions thereof which define master characters, being opaque to light. The plates 45 may be secured to said bands 38 by any suitable means, preferably by cement, and may be of any proper material, such as celluloid having a developed film or negative of collodion or other suitable sensitized substance thereon.

The drum 30 has integral therewith a hub 50 through which and the aforesaid flanged sleeve 28 extends a shaft 54.

The shaft 54 is journaled at one end in the flanged sleeve 28 and has circumferentially mounted at this end a race member 60 which is secured thereto by means of a plate 63, Fig. 3. This race member 60 has a ball-bearing engagement with a companion race member 64 secured to the flanged sleeve 28. Roller bearings 65 are also mounted between the shaft 54 and the flanged sleeve 28.

The other end of the shaft 54 is journaled in a flanged bearing 66 which is integral with a pair of radially extending supports 67 and which is associated with the shaft 54 through a ball-bearing arrangement 70. These supports 67 are secured to one end of a pair or horizontal arms 68 by means of hand screws 69, Figs. 1 and 2. The other ends of these arms are suitably connected to the channel plate 20 for vertical movement therewith.

Mounted at the end of the shaft 54 is a character selector unit 71. This unit comprises a dial 73 secured to the flange of the bearing 66 by means of pins 74. This dial 73 is provided with a plurality of apertures 75 circumferentially arranged, Fig. 1. Each of said apertures 75 corresponds to a particular character on the bands 38 and has disposed adjacent thereto indicia 76 which designate three particular characters.

Cooperating with the dial 73 is a pointer 77. Affixed to this pointer 77 is a nut 87 which is provided with a diametrically extending bore. One end of the pointer 77 is provided with a stepped bore 78, Fig. 3. Passing therethrough is a spindle 79 having a knob 80 at one end and also a collar 83 intermediately positioned so as to normally cooperate with an annular shoulder 84 in the bore 78. An apertured plate 85 is mounted across the entrance to the bore 78 in which is disposed a coil spring 86 to normally urge the end of the spindle 79 into cooperative engagement with any selected aperture 75 in accordance with the dialing of any desired character.

The rotation of the drum 30 in response to the dialing of a selected character is effected through the agency of a spindle 89. This spindle is provided at one end with a knob 90 and is affixed to the pointer 77 by means of a tapered pin 93 extending through the aforesaid bore of the nut 87 and one of three holes 94 along said spindle. These holes 94 are spaced along the spindle 89 in accordance with the transverse space between the rows of apertures 33 on the drum.

The shaft 54 is provided with an axial bore 95 for the reception of the spindle 89. This shaft 54 is also provided with a slot 96 which acts as a guideway for a pin 97 passing through aligned radial holes in the hub 50 and the end of the spindle 89 respectively.

The hub 50 of the drum 30 is keyed to the shaft 54 for slidable, non-rotatable movement thereon and, to translate the drum 30 into any one of three selective positions along the shaft 54, the pin 93 is withdrawn and the spindle 89 pulled out through the manipulation of the knob 90, so as to register the selected one of the three holes 94 with the bore of the nut 87. The spindle 89 through its cooperation with the pin 97 draws the drum along the shaft 54. The pin 93 is then replaced to lock the spindle 89 in the selected place.

To rotate the drum 30 into any selective position, the knob 80 is pulled out and the pointer 77 rotated. The rotation of this pointer is imparted to the drum 30 through the agency of the spindle 89 and the cooperating pin 97. The drum can be locked into position by releasing the knob 80 and permitting the spindle 79 connected therewith to engage in any selected aperture 75.

Mounted inside the drum 30 is a light chute 103 comprising a horizontal section 109 disposed in the direct path of the rays emitted from the lamp 13, and also a vertical section 110 adapted to guide rays through the selected apertures 33 of the drum, Fig. 3. This chute is secured to the sleeve 28 by means of brackets 104, which are held together by bolts 105 and which are provided with flanges 106 bolted to brackets carried by the light chute 103.

Between the sections 109 and 110 of the chute 103 is disposed a reflecting plate 113 which is adapted to vertically divert the rays through the condensing lens system 114 mounted in said section 110. This section 110 is suitably reinforced by means of angle irons 115 welded to each of its sides.

Mounted underneath the bed plate 4 is a shelf 117. This shelf 117 is provided with a plurality of rail supports 118 upon which are mounted a pair of rail members 119, Figs. 1 and 2.

Riding on these rail members 119 is a sensitized film carriage unit 116. This unit comprises a main casting 120 which is provided with four pairs of depending brackets 123 spaced in quadrilateral relationship. Each of said pairs of brackets has journaled therethrough axles 124 on which are mounted rollers 125 adapted to ride on the rails 119.

Depending from the bottom of the main casting 120, Fig. 1 is a bush 121 which engages a feed screw 122 journaled in a bracket 100. This bush travels between two guide plates 111 secured to the shelf 117, Fig. 4.

The end of the feed screw 122 terminates in a crank handle 132, the manipulation of which effects the translation of the carriage unit 116 along the rails 119. If desired, the amount of translation of the carriage unit 116 along the rails 119 may be designated by any suitable micrometer dial arrangement, not shown.

Secured to the sides of the main casting 120 are angle pieces 112, Fig. 1, having suitable angle braces welded thereon. Also secured to this casting 120 at the rear thereof are detent lugs 127. Positioned between the aforesaid angle pieces 112 is a removable lightproof casing 128, the rear portion of which abuts the detent lugs 127. Said casing 128 is provided with a hinged closure member 131 to permit access to the interior thereof, Fig. 1.

To hold the casing 128 in place, the front portion of the casting 120 has pivotally mounted thereon a pair of arms 129 which are provided therethrough with finger screws 130 adapted to impinge on the bearing plates 133 secured to the front of said casing.

Extending through the casting 120 is a spindle 91 having a handle 92 at one end and a lever arm 101 secured at the other end, Figs. 1 and 4. At the ends of this lever arm 101 are pivotally mounted a pair of links 102, the other ends of which are similarly connected to arms 171. These arms 171 are secured to spindles 172 journaled in the front and rear portion of the casting 120. Secured to the spindles 172 between the said front and rear portions of the casting 120 are plate members 181. It should be noted that by means of this arrangement the casing 128 can be elevated vertically through the action of the plate members 181 in response to the actuation of the handle 92. The amount of elevation can be predetermined by means of a pawl 182 pivotally mounted on one of the links 162. This pawl 162 cooperates with a rack 161 which is secured to the casting 128 and which has mounted thereon a scale 162.

Figures 5, 6 and 7 show details of the casing 128, which comprises a frame structure 134, the end members 135 of which are provided with circular channels 136. Mounted on the frame structure 134 are blocks 137 having circular edges 138. These edges 138 are concentrically mounted adjacent the channels 136 and spaced therefrom so as to define circular passageways 139. These passageways serve as guides for a flexible rolling cover 140. This cover consists of a plurality of slats 143 attached to a strip of canvas 144 and linked together as shown in Figure 6. This cover arrangement is mounted in track grooves 145 and 146 provided in the frame structure 134 as shown in Figure 7. The bottom section of the cover 140 includes a strip 147, the position of which as shown defines the end of the travel of said cover. The top section of the cover has a member 148 with an opening 149 on each side of which are provided ledges 150. Guided along these ledges is a substantially flexible curtain 153 preferably made of phosphor bronze and provided with a square aperture 154 which constitutes a means of access to the interior of the casing 128.

The ends of this curtain 153 are coiled up in cylindrical cases 155 and 156 which are mounted on the member 148. It should be observed that, as the curtain 153 is translated along the ledges 150, one end thereof will coil up in one casing while the other end unwinds itself in the other.

The interior of the casing 128 is provided with a shelf 157 on the sides of which are mounted slats 158. On one end of these slats are secured wedges 159 which support a sensitized film holder in the form of a metal plate 160. This plate is integrally provided at the bottom with wedges 163 which are similar to the wedges 159 and which are supported by slats 158, Fig. 6. The top face of the metal plate 160 has lugs integral therewith which serve as guides for the location of a sensitized film 165. Disposed over this sensitized film is a plate glass 166 which is mounted over the plate 160 and sensitized film 165, Figs. 6 and 7. This assemblage is positioned in the casing 128 by sliding it through the opening adjacent the hinged closure 131.

Disposed between the casing 128 and the drum 30 is a camera unit 167, Figs. 3 and 8. This camera unit comprises a casting 169 secured to the channel plate 20 by means of bolts 170. The top portion of said casting 169 is positioned proximate to the periphery of the drum 30 and is generally shaped to conform to the circular periphery of said drum. This casting 169 is provided with an opening 173 to permit the passage of light rays therethrough. However, the amount of light rays passing through this opening is restricted by a detachable slide 174 having a square aperture 175 and positioned over the opening 173. This slide is held in place between the base 176 of the casting 169 and lugs 177 which are integrally secured to one side of said casting. The slide 174 is also positioned between the lugs 178 which are integrally connected to the base 176 of the casting 169. This slide 174 is slipped into position, as shown, through a cut-away portion 179, Fig. 2, of said casting 169. If desired, a screen may be placed over the top surface of the slide 174 in order to produce shaded effects in the letters as will be more apparent hereinafter. The distance between the base 176 and the lugs 177 permit the positioning therebetween of such a screen.

Cemented or otherwise secured to the casting 169 is one end of a bellows 180, the other end of which is similarly secured to a mirror housing 183. This housing is secured to the frame structure 8 of the carriage unit 5 by means of bolts 184 passing through flange portions 185 of said housing.

Journaled to the sides of said housing 183 is a rock shaft 186 upon which is fixed a plate 187 having a mirror 188 secured thereto. The rock shaft 186 extends beyond the outside of the housing 183 and has pinned to the extending portion thereof an arm 189, the free end of which is pivotally connected to a bifurcated member 190. This member 190 is connected to one end of a tube 193, the other end of which terminates in a conventional plunger arrangement 194 adapted to actuate a photographic shutter hereinafter referred to.

The free end of the arm 189 is integrally provided with a lug 195 which is connected to one end of a spring 196, the other end of which is secured to a pin 197 in the frame structure of the housing 183. Mounted on the outside of said housing 183 is a bracket 198 which has passing therethrough a thumb screw 199 adapted to impinge on a bearing plate 200 on the arm 189. This thumb screw serves to adjust the angular position of the arm 189 and the corresponding position of the mirror 188. It should be noted that the mirror 188 is positioned in the path of the rays passing through the bellows 180. This mirror can, however, be positioned outside the range of these rays by pulling the tubing 193 against the action of spring 196. The amount of angular travel of this mirror 188 during this operation is determined, however, by a detent 203 secured to the side of the housing 183.

Secured to the under side of the housing 183 is one end of a second bellows 204, the other end of which is secured to a frame member 205 upon which is mounted a conventional photographic lens system (not shown) and a suitable automatic shutter arrangement 206, the details of which are eliminated for the sake of simplicity. This shutter arrangement 206 is actuated in response to the actuation of the plunger arrangement 194, the tubular member 193 being connected for that purpose to the shutter 206 through a flexible tubing 207.

The frame structure 205 is connected to a slider 208 which is arranged to travel along a member 209 secured to the frame structure of the housing 183 by means of bolts 210. Journaled to the side of the slider 208 is a shaft 213 upon which is mounted a toothed wheel 214. This toothed wheel 214 meshes with a rack 215 secured to the member 209. Passing through the slider 208 is a hand-locking screw 216, the end of which impinges on said member 209. By this arrangement the slider 208 can be moved along the member 209 and fixed in any selective position by means of locking screw 216. This determines the corresponding selective position of the photographic lens system. To establish this photographic lens system in a predetermined position, a pointer 211 is provided which is secured to the slider 208 and which indicatively co-operates with a scale 212 mounted on the frame structure of the housing 183. Obviously, the scale 212 may be calibrated in units which will indicate the size of the images to be printed on the sensitized surface 165.

Figure 9:
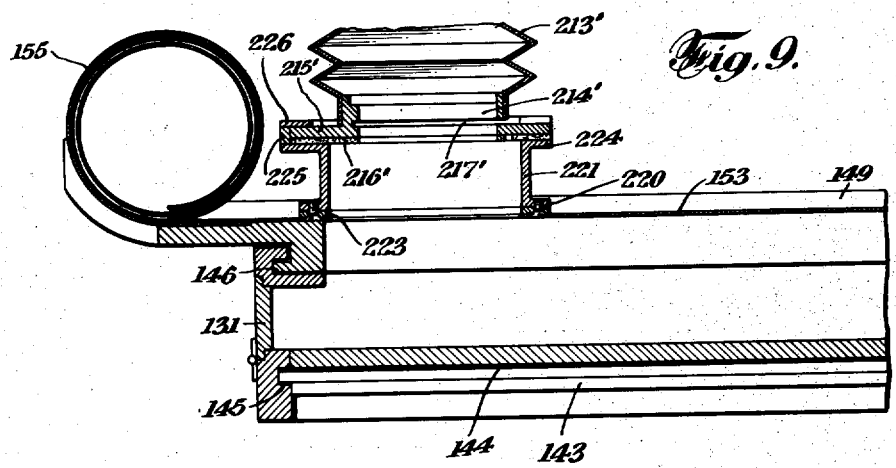
Fig. 9 is an enlarged, vertical sectional view of a part of the machine shown in Figs. 1, 2 and 3.

The under side of the frame structure 205 is connected to one side of a third bellows 213', the other side of which is secured to a member 214', Fig. 9. This member 214' has flanges 215' on the under side of which is adhesively secured a layer of plush 216'. The member 214' is also provided with a slot 217' for the reception of a light shutter (not shown). The flanges 215' are alternately provided with projections 218 and notches 219. The member 214' rests on a sleeve member 221 having a bottom flange 220 which is conjointly secured to a gasket 223 and curtain 153. The sleeve 221 is also provided with a top flange 224 to which is secured by suitable means around three edges thereof spacing strips 225. To the top of said strips is connected an end strip 226 and a pair of side strips 227. The strips 227 are provided alternately with projections 229 and notches 230 which correspond to the projections 218 and notches 219 of the flanges 215' respectively. All of the strips 226 and 227 conjointly define with spacing strips 225 and flange 224 channels 228. These channels receive three edges of the flanges 215' as shown in Figure 10.

Figure 10:
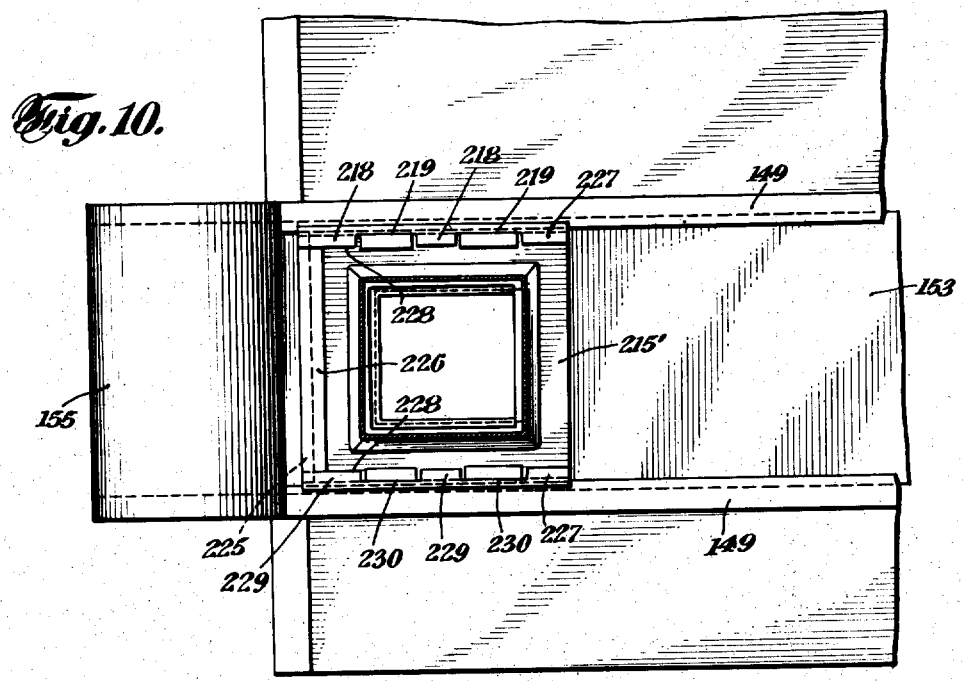
Fig. 10 is a plan view of the arrangement shown in Fig. 9.

In assembling the bellows 213' to the curtain 153, the projections 218 on the flanges 215' are passed through corresponding notches 230 of the strips 227 and then slipped into place, as shown in Fig. 10, so that each of the projections 218 is disposed underneath the corresponding projections 229.

The sleeve member 221 is maintained in alignment with the photographic axis of the camera by means of a yoke 233 having a pair of prongs 234 which embrace the outside of said sleeve member (Figures 4 and 8). This yoke has secured thereto a vertical arm 235 which is provided with a slot 236. This slot 236 has passing therethrough a bolt 237 having a threaded engagement with the guide member 209. The vertical position of said prongs can be selectively adjusted by sliding said slot 236 along said bolt 237 and tightening said bolt in the desired position.

Secured to the housing 183 is a tubular casing 238 which is mounted in axial alignment with the axis of the rays reflected by the mirror 188, Fig. 8. Telescopically mounted inside said tubular casing is a slidable member 239 upon which is mounted a lens system 240, Fig. 3. This tubular casing 238 is provided with a pair of aligned slots 243 extending longitudinally thereof and adapted as a guide for the travel of two screws 244 having threaded engagement with the slidable member 239. The screws 244 are provided with caps 245, the annular edges of which are adapted to impinge on the side of the casing 238, so as to lock the lens system 240 in any selective position. Adjacent one of the slots 243 is a scale 246 having two sets of graduations 247 and 248 designated thereon, the significance of which will hereafter be described. The slidable member 239 has a mark 249 secured thereto which is adapted to indicate on the scale 247.

Secured to the top of the casing 238 is a guide rail 250. Positioned over said guide rail is a channel member 251 which is provided with a slot 252 extending longitudinally thereof. Passing through said slot is a capped screw 253 having a threaded engagement with the guide rail 250. The side of said channel member 251 has a threaded engagement with a cap screw 254, the end of which impinges upon the side of the guide rail 250 and serves to lock said channel member in selected positions. The channel member 251 is also provided with a pointer 255 adapted to indicate on the scale 248.

The end of the channel 251 is provided with an angular extension 255 which has secured thereto a plate 256 having a reflecting surface 257. This plate is disposed at an angle of 45 degrees with the axis of the casing 238 and is adapted to reflect the rays impinging thereon upon a layout table 258 carried by a guide plate 260 which is fixedly secured to the horizontal portions of the angle pieces 112, Fig. 3.

In Fig. 1, there is illustrated a feed screw 316 which is journaled at one end in an angular bracket 318 and which is also threaded to the frame structure 8 of the carriage unit 5. Adjacent said bracket 318, the screw 316 carries a bevel gear 315, Fig. 5, which meshes with a bevel gear 314 carried by a shaft 309. Rotatable with said shaft 309 is a spur gear 325 which meshes with a second spur gear 324 rotatable with a shaft 319 having a crank handle 318 at the end thereof.

When the operator actuates the crank handle 318, the feed screw 316 is rotated by the described chain of mechanism to effect movement of the carriage unit 5 longitudinally of the machine. As hereinbefore described, this carriage unit 5 carries many parts of the projector mechanism, to wit, the lamp 13, character-bearing drum 30, the camera unit 167, mirror housing 183, bellows 204, shutter 206, and bellows 213'. Further, as clearly appears, the above described rotation of the feed screw 316 causes the curtain 153 and its aperture 154 to move longitudinally with respect to the now stationary sensitized surface 165, that is, from left to right or vice versa, Figs. 5 and 6, depending on the direction of rotation of said screw 316.

Actuation of the hereinbefore described crank handle 132 causes rotation of the feed screw 122 to effect translation of the carriage unit 116 along the rails 119, said carriage unit 116 carrying the above described layout surface 259 therewith. In response to this rotation of the feed screw 122, the sensitized surface 165 moves vertically, Fig. 5, in one direction or the other with respect to the now stationary curtain 153 and its aperture 154.

Accordingly, by virtue of the operations described above, any desired section of the sensitized surface may be positioned at will opposite the aperture 154 and, as clearly appears, this aperture defines the path of the projecting light beam which passes from the lamp 13, through the selected character adjacent the aperture 175, through the bellows 180 and 204, through the shutter 206 and bellows 213' provided, of course, that the mirror 188 is in its vertical position, Fig. 8.

Therefore, assuming that a desired section of the sensitized surface is opposite the aperture 154 of curtain 153 and that the mirror 188 is in its vertical position, Fig. 8, a photographic print of that character or representation then in the path of the projecting light beam may be obtained upon actuation of the member 194 to effect operation of the shutter 206. Thereupon, the carriage unit 5 may be shifted with respect to the sensitized surface 165, or the latter may be shifted with respect to said carriage unit 5 in the manner hereinbefore described to position a desired section of said sensitized surface 165 in the next printing position whereupon the shutter 206 may again be operated as described to obtain a photographic print of the same or of a different character. These operations may be proceeded with as desired and in an obvious manner to those skilled in the art to obtain a desired arrangement of photographic prints on the sensitized surface.

I have shown on the drawings a spacing unit 277, Figs. 1 and 2, which is described at length in my aforesaid Letters Patent No. 1,893,439. There is no reference to this spacing unit in the claims of this application and, therefore, no further description thereof will be given herein other than to state that it constitutes an arrangement which may be used, if desired, for automatically shifting the projector mechanism, by operation of the feed screw 316, distances corresponding with the width of the respective master characters, the images of which are to be printed on the sensitized surface 165.

Further, there is no reference in the claims of this application to the above noted layout table 259 and hence no further description thereof will be given other than to state that it is the surface of this layout table which receives an image of a master character prior to the printing of a corresponding image upon the sensitized surface 165. This phase of operation of the photo-printing machine is fully described and claimed in my aforesaid Letters Patent No. 1,893,439. As will hereinafter appear, the claims of this application are confined to the multiplying camera features of the photo-printing machine and there is no need, therefore, to enter into a discussion of the manner in which compositions are prepared by use of the layout table. These multiplying camera features of the present invention are of distinct importance since they involve a dark chamber for the sensitized surface, a light-excluding path between said surface and the master character, or equivalent, the entire arrangement being flexible as described to permit the various adjustments of parts in an efficient manner for the production of highly satisfactory photo compositions.

It will be understood that in so far as the present invention is concerned, it is important that there shall be in the path of the projecting light beam a representation, the image of which is to be printed one or more times on the sensitized surface 165. It is merely a matter of choice as to the manner in which this representation is supported whether on the drum 30, on a reciprocatory plate-like carriage as described in said Letters Patent No. 1,893,439, or in any other suitable manner as may be desirable. The drum or plate-like carriage, when utilized, may support true master letters or any other representation which is to have one or more images thereof imprinted on the sensitized surface 165.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a photo-lettering machine, the combination comprising a lightproof casing adapted to have a sensitized surface positioned therein, means for covering said casing, said means comprising an endless rolling cover movable in one line of direction and an apertured curtain movable in a line of direction transverse thereto, said cover and curtain being disposed in substantially the same plane, a camera secured to said curtain to cover the aperture therein, means for moving said casing in one direction while said curtain and camera remain stationary, and means for moving said curtain and camera in another direction while said casing remains stationary.

2. In a photo-lettering machine, the combination comprising a lightproof casing adapted to have a sensitized surface positioned therein, means for covering said casing, said means comprising an endless rolling cover movable in one line of direction and an apertured curtain movable in a line of direction transverse thereto, said cover and curtain being disposed in substantially the same plane, a camera secured to said curtain to cover the aperture therein, means for moving said casing in one direction while said curtain and camera remain stationary, means for moving said curtain and camera in another direction while said casing remains stationary, and means for coiling and uncoiling the respective ends of said curtain.

ASHLEY G. OGDEN.